(12) United States Patent
Koch et al.

(10) Patent No.: US 12,697,985 B2
(45) Date of Patent: Aug. 4, 2026

(54) METHOD FOR CHECKING AN AUTOMATED DRIVING VEHICLE PRIOR TO STARTING A DRIVE, AND AUTOMATED DRIVING VEHICLE

(71) Applicant: Volkswagen Aktiengesellschaft, Wolfsburg (DE)

(72) Inventors: Niklas Koch, Tappenbeck (DE); Jana Seeland, Wolfsburg (DE); Christian Hopp, Wolfenbüttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 155 days.

(21) Appl. No.: 18/740,193

(22) Filed: Jun. 11, 2024

(65) Prior Publication Data

US 2024/0416931 A1    Dec. 19, 2024

(30) Foreign Application Priority Data

Jun. 15, 2023    (DE) .......................... 102023205629.1

(51) Int. Cl.
*B60W 50/02*        (2012.01)
*G07C 5/02*         (2006.01)
*B60W 60/00*        (2020.01)

(52) U.S. Cl.
CPC ........... *B60W 50/0205* (2013.01); *G07C 5/02* (2013.01); *B60W 60/001* (2020.02)

(58) Field of Classification Search
CPC ........... B60W 50/0205; B60W 60/001; B60W 30/06; B60W 50/14; B60W 50/04; B60W 2050/041; G07C 5/02
See application file for complete search history.

(56) References Cited

U.S. PATENT DOCUMENTS 4,727,549 A  *  2/1988  Tulpule ............... G06F 11/2236
                                                714/E11.166
10,960,894 B2 *  3/2021  Braley ................ B60W 50/029
                        (Continued)

FOREIGN PATENT DOCUMENTS

DE        102015207486 A1    10/2016
DE        102015209976 A1 *  12/2016    ............... B62D 1/00
                        (Continued)

OTHER PUBLICATIONS

DE102015209976A1 machine translation (Year: 2016).*
                        (Continued)

*Primary Examiner* — Fadey S. Jabr
*Assistant Examiner* — Mark Robert Heim
(74) *Attorney, Agent, or Firm* — Peter Zura; LOZA & LOZA, LLP

(57)                ABSTRACT

Technologies and techniques for verifying the operational readiness of an automated driving vehicle before initiating a drive is disclosed. The method involves performing a pre-defined set of automated checks each time the vehicle is started. These checks are executed using predefined combinations of the vehicle's sensor system and actuator system. Additionally, the method includes verifying that cyclic checks conducted under predefined conditions in the past were completed successfully with sufficient frequency. The drive is enabled if both the startup checks and the past cyclic checks meet the required criteria. Aspects of the present disclosure also pertains to the automated driving vehicle itself.

20 Claims, 2 Drawing Sheets

(56)                    References Cited

U.S. PATENT DOCUMENTS

| | | | | |
|---|---|---|---|---|
| 12,151,703 | B2 * | 11/2024 | Köstermann | B60W 50/10 |
| 2016/0047660 | A1 * | 2/2016 | Fausten | G08G 1/0129 |
| | | | | 701/25 |
| 2017/0129487 | A1 * | 5/2017 | Wulf | B60W 30/09 |
| 2017/0205824 | A1 * | 7/2017 | Nordbruch | G08G 1/147 |
| 2017/0269593 | A1 * | 9/2017 | Letwin | B60W 60/0059 |
| 2017/0291615 | A1 * | 10/2017 | Kusano | B60W 30/12 |
| 2020/0005561 | A1 * | 1/2020 | Schröder | G07C 5/0808 |
| 2020/0320802 | A1 * | 10/2020 | Yang | B60W 50/0097 |
| 2021/0160433 | A1 * | 5/2021 | Berne | G01C 21/3461 |
| 2021/0181737 | A1 * | 6/2021 | Patnaik | B60C 23/06 |
| 2023/0044709 | A1 * | 2/2023 | Jung | B60W 50/10 |
| 2023/0234598 | A1 * | 7/2023 | Kobayashi | G07C 5/0808 |
| 2023/0282039 | A1 * | 9/2023 | Duan | G05B 23/0221 |
| | | | | 701/31.4 |
| 2024/0034341 | A1 * | 2/2024 | Qu | B60W 50/06 |
| 2024/0045426 | A1 * | 2/2024 | Ditty | G05D 1/0088 |
| 2024/0062590 | A1 * | 2/2024 | Quinz | G07C 5/02 |
| 2024/0416924 | A1 * | 12/2024 | Liu | B60W 30/146 |
| 2025/0378722 | A1 * | 12/2025 | Pham | G07C 5/008 |

FOREIGN PATENT DOCUMENTS

| | | | | |
|---|---|---|---|---|
| DE | 102018213011 | A1 * | 2/2020 | G01M 17/007 |
| DE | 102021212438 | A1 | 5/2023 | |
| GB | 2618365 | A * | 11/2023 | B60K 6/387 |

OTHER PUBLICATIONS

DE102018213011A1 machine translation (Year: 2020).*
Priority German Application No. 102023205629.1. Examination Report (Feb. 20, 2024).

* cited by examiner

METHOD FOR CHECKING AN AUTOMATED DRIVING VEHICLE PRIOR TO STARTING A DRIVE, AND AUTOMATED DRIVING VEHICLE

RELATED APPLICATIONS

The present application claims priority to German Pat. App. No. DE 10 2023 205 629.1, filed Jun. 15, 2023, to Koch et al., the contents of which are incorporated by reference in its entirety herein.

TECHNICAL FIELD

The present disclosure relates to technologies and techniques for checking an automated driving vehicle prior to starting a drive, and to an automated driving vehicle.

BACKGROUND

Automated or autonomously driving vehicles must be checked by a user every time prior to starting a drive to be allowed to be operated in an automated or autonomous manner. This results in great effort and costs for the user.

A method for predicting and handling tire blowouts in vehicles that are operated in self-driving (autonomous) mode is known from US 2021/0 181 737 A1. The aspects encompass determining a likelihood of a tire failure, including actions that the vehicle can take to decrease the likelihood of failure. Pre-trip and real-time system checks can be conducted. A vehicle model, including the tires, may be employed in blowout prediction. The on-board system can store received data and detected sensor data regarding the tire pressure and temperature, which can be evaluated based on the model so as to avoid a tire blowout or minimize the likelihood of a tire blowout, taking various factors into consideration. The factors can include the load weight and distribution of cargo, current and upcoming weather conditions on the route, the number of miles traveled per tire, as well as detected obstructions, such as potholes, debris or other roadway impairments. Should a blowout occur, the autonomous system can immediately take any necessary corrective action.

A method is known from US 2021/0 160 433 A1, involving using at least one vehicle camera to automatically check whether certain elements of the vehicle are in a safe condition before starting off and informing the driver of the check results, for example by displaying the check results on the dashboard of the vehicle.

SUMMARY

Aspects of the present disclosure are directed to technologies and techniques for checking an automated driving vehicle prior to starting a drive and an automated driving vehicle, in which the process of conducting the check is improved and in particular is associated with less effort for a user of the vehicle.

Some aspects of the present disclosure are provided in the subject matters of the independent claims, found below. Other aspects are disclosed in the subject matter of the respectively associated dependent claims, the description and the figures.

In some examples, a method is disclosed for checking an automated driving vehicle prior to starting a drive is provided. A set of predefined checks is conducted in an automated manner each time when starting a drive, wherein this is conducted at least partly by means of predefined combinations of a sensor system and an actuator system of the vehicle, and wherein it is furthermore determined whether checks conducted cyclically in the past under predefined conditions were conducted successfully with sufficient frequency, wherein a drive by way of the automated driving vehicle is enabled when the checks conducted when starting the drive were conducted successfully and the checks conducted under predefined conditions were conducted successfully with sufficient frequency.

In some examples, an automated driving vehicle is disclosed, comprising a control device, wherein the control device is configured, every time when starting a drive, to prompt that a set of predefined checks is conducted in an automated manner, wherein this is conducted at least partly by means of predefined combinations of a sensor system and an actuator system of the vehicle, and furthermore to check whether checks conducted cyclically in the past under predefined conditions were conducted successfully with sufficient frequency, and to enable a drive by way of the automated driving vehicle when the checks conducted when starting the drive were conducted successfully and the checks conducted under predefined conditions were conducted successfully with sufficient frequency.

A vehicle as disclosed herein may be a motor vehicle. The vehicle, however, can generally also be another land vehicle, a rail vehicle, a watercraft, an aircraft or a space craft, for example an air taxi or a drone. In particular, the method can generally also be employed for checking another system operated in an automated manner during the start-up thereof, for example in industry. The embodiments described in the present disclosure also apply analogously to the method for checking such a system.

Further features regarding the embodiment of the automated driving vehicle will be apparent from the description of embodiments disclosed herein. The advantages of the vehicle are in each case the same as for the embodiments of the method.

DESCRIPTION OF THE DRAWINGS

Aspects of the present disclosure will be described in more detail hereafter based on preferred exemplary embodiments and examples with reference to the figures. In the drawings.

DETAILED DESCRIPTION

Figure 1:
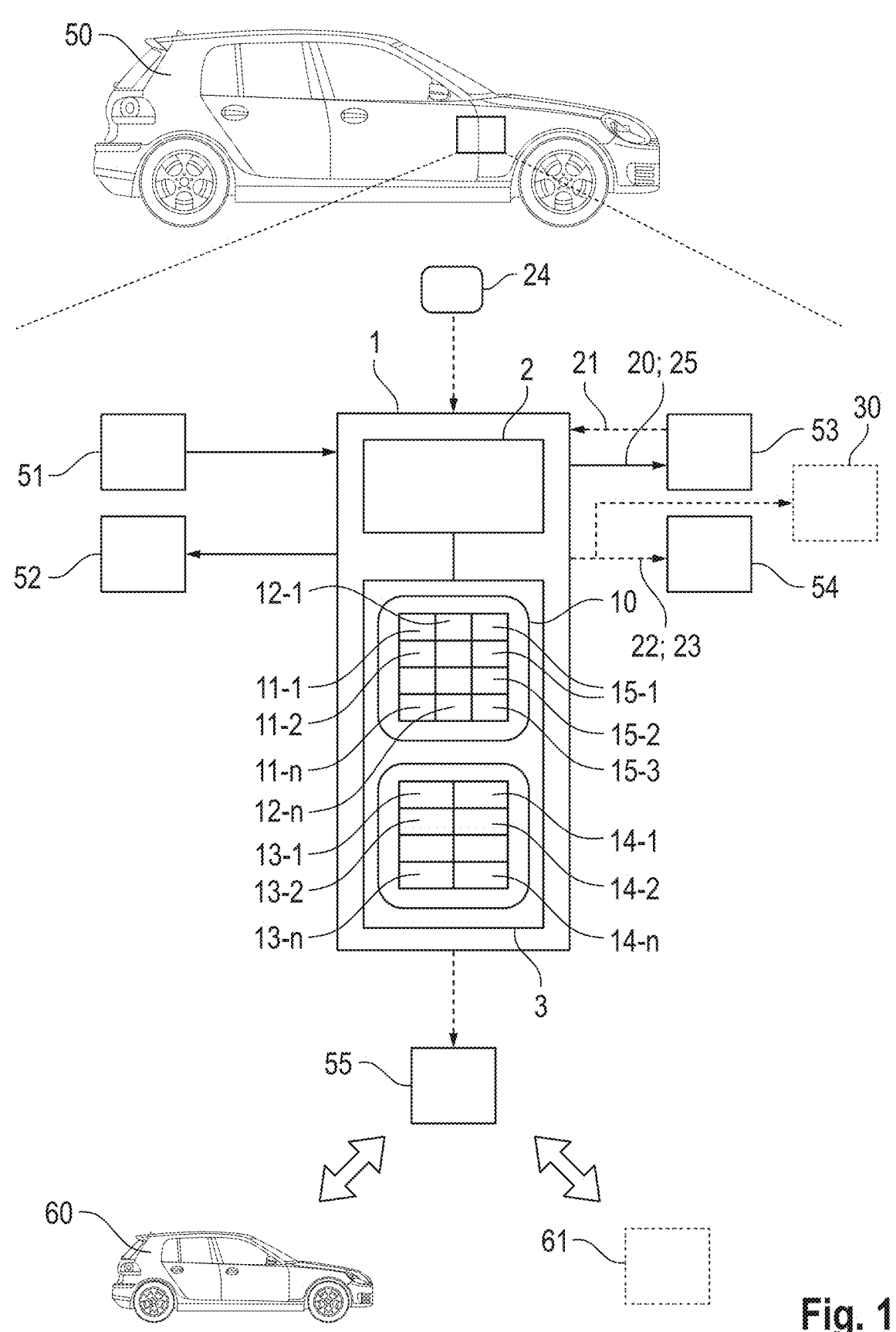
FIG. 1 shows a schematic representation to illustrate embodiments of the automated driving vehicle and of the method, according to some aspects of the present disclosure.

The present disclosure provides methods and an automated driving vehicle that enable necessary checks to be conducted automatically. This process utilizes two distinct check paths:

First, a set of predefined checks is performed when starting a drive. These checks occur immediately upon initiating the drive. The phrase "when starting a drive" includes the period before the drive begins while the vehicle is parked, the time during which the vehicle is being turned on, and the moments immediately after the vehicle has been turned on. This ensures that the current condition of the automated driving vehicle is assessed. If all the predefined checks in the set are successful, the automated drive mode is enabled. Otherwise, automated operation is blocked.

Second, the method verifies that cyclic checks conducted under predefined conditions in the past were completed successfully and with sufficient frequency. These cyclic checks occur during normal operation whenever the specific predefined conditions are met. Additionally, the predefined conditions can be intentionally triggered to carry out the checks. The cyclic checks are recorded using counters, such as In-Use Monitor Performance Ratio (IUMPR) counters. During verification, the counter readings are compared to predefined minimum values for the frequencies, which relate to the number of successful runs of each check per predefined time interval. If the minimum values are met, automated operation is enabled. Otherwise, it is blocked. Automated driving is only enabled when both paths permit automated driving.

The predefined checks involve combinations of the vehicle's sensor system and actuator system. These checks can utilize various components, including, but not limited to:

A microphone for detecting sound.

A surroundings sensor system (e.g., cameras, LIDAR, radar, ultrasound).

Movement estimation tools (e.g., odometry, speed, and acceleration measurement, ESC system data).

Self-localization systems (e.g., localization, navigation, global satellite navigation systems).

Haptic perception tools (e.g., steering torque detection, vibration detection via microphones).

Temperature measurement devices (e.g., for motor or battery).

Logic monitoring systems (e.g., rules-based or machine learning-based vehicle behavior plausibility checks).

Actuator system changes (e.g., steering movements, air suspension system adjustments).

For example, a combination might include a steering actuator system and a surroundings sensor system. A deflection of the steerable wheels is caused by the steering actuator system, and the surroundings sensor system detects changes in the environment. The detected change is compared to reference values, considering the extent of the steering deflection. If the detected change matches the expected reference, the check is successful; otherwise, it fails.

Another combination might involve a brake and an electric or internal combustion engine, where the vehicle starts against a blocking brake. The check is successful if the vehicle does not move or demonstrates a certain braking force. Another example includes a headlight and a surroundings camera, where the headlight projects a predefined image or illumination detected by the camera. The detected image is compared to an expected image, and the check is successful if deviations are below a predefined threshold. Tread depth of tires can also be determined and checked via optical measurements.

Checks before starting a drive are only performed when the vehicle's surroundings permit. A safety assessment determines if a check is feasible under current conditions. For instance, starting against a blocking brake on a hill at night during frost may be deemed unsafe, preventing automated checks under such conditions.

The checks may also include self-diagnoses of vehicle systems and installations, such as airbags and seat belt tensioners, which can be checked through self-diagnosis when starting a drive.

The predefined conditions encompass various categories. One category includes conditions that occur regularly during a drive (e.g., specific speed ranges, road types), where checks are conducted during regular drives. Another category includes conditions occurring after a drive (e.g., vehicle cooling processes), where checks are conducted post-drive. A further category includes conditions established by the vehicle to meet required check frequencies (e.g., specific surroundings conditions), where checks are conducted after establishing these conditions.

The results of the checks may be documented, storing information about each result and the execution time in a memory of the control device. This allows for later determination of the success or failure of specific checks. Documentation may also occur on a back-end server.

Comparisons to historical data and/or reference data may be included in the checks. Current check data can be compared to historical data, assessing deviations based on predefined thresholds. Historical and/or reference data can be stored on a back-end server and retrieved as needed during checks.

Surroundings detection and mapping when parking the vehicle can be used as a basis for comparison when starting a drive. Checks before starting a drive can be initiated while the vehicle is stationary, anticipating an automated drive. This ensures the vehicle is operational at the beginning of the desired automated drive or reduces waiting periods since most checks have already been conducted.

The set of predefined checks and cyclic checks can be selected and defined based on the vehicle's operating location, accommodating country-specific requirements (regulations, laws, standards). The selection and definition can occur automatically from a stored list of checks for respective locations.

Users or keepers of the vehicle can define whether and when the checks are conducted. They can specify when checks should not be conducted.

Components of the automated driving vehicle, particularly the control device, can be designed as a combination of hardware and software, such as program code executed on a microcontroller or microprocessor. Alternatively, they may be designed as application-specific integrated circuits (ASICs) and/or field-programmable gate arrays (FPGAs).

In some examples, different confidence levels are assigned to the predefined checks in the set. The checks are conducted when starting a drive in the rank order of the confidence levels, with higher-ranking checks performed only after the successful completion of all preceding levels. This approach incrementally enables a broader scope of functions for the automated driving vehicle during the automated check process. The scope of functions can expand with each higher confidence level. For instance, adhering to statutory requirements, confidence levels might correspond to maximum speeds (e.g., 6 km/h, 10 km/h, and so on, up to no limit) for which an automated drive is enabled. Additionally, a distinction can be made between private and public surroundings, allowing for a slow automated drive on private property at a specific confidence level, but not yet in public space.

In some examples, the checks in the set include checks at a standstill, checks when driving slowly, and checks while driving, with the confidence levels ascending in this order. This setup allows for the incremental testing of an expanded scope of functions. The scope of checks can also expand while the vehicle is moving. Slow driving typically includes speeds below a predefined limit (e.g., 6 km/h or 10 km/h). During this slow drive, surroundings perception can be checked using sensors like cameras, radar, LIDAR, and ultrasound. A plausibility check of object movement can be carried out based on vehicle movement. While driving, sensor signals and data that are either undetectable or only partially detectable at a standstill or slow speeds can be assessed. Driving dynamics and acoustic abnormalities, such as rattling or knocking, can also be checked. A route is selected where the vehicle can be safely stopped at any point without posing a traffic obstacle or risk.

In some examples, a route suitable for the particular checks is determined and followed when driving slowly or during normal driving. This ensures that checks are conducted more efficiently and in less time, potentially using map data from the vehicle's navigation system. The route might include surroundings objects suitable for sensor checks or secondary roads that do not disrupt traffic flow.

In some examples, the route is determined considering a previously achieved confidence level. This allows the route to be adapted to the vehicle's current scope of functions. For instance, a route for a lower confidence level might be limited to private property (e.g., an access road or an underground parking garage). At higher confidence levels, the route could include public roads.

In some examples, the checks in the set and the cyclic checks each have a temporal validity. The execution of a particular check is suspended, and the check is considered passed if its temporal validity has not yet elapsed. This approach limits checking to necessary instances, saving time, effort, and costs by avoiding redundant checks.

In some examples, a suitable position and/or orientation for the set of predefined checks is selected when parking the automated driving vehicle. This preparation ensures that the pending checks during the subsequent start of a drive can be conducted without delay. Suitable positions and/or orientations can be saved in a surroundings map stored in the vehicle's navigation system and retrieved based on the vehicle's current position. Alternatively, the current surroundings can be evaluated for suitability, such as checking a surroundings sensor system using objects in the vicinity. Positions and/or orientations allowing optimal detection by the sensor system are considered better suited, and the vehicle can head to these locations accordingly.

In some examples, a user of the vehicle is prompted to conduct one or more checks if it is not possible to perform at least one of the predefined checks automatically. This allows for checks that cannot be automated to be conducted with the user's help. Notifications, which can be displayed on the vehicle's display unit or a mobile device, may include instructions for the user to perform the check(s).

In some examples, a user is given an action recommendation based on the results of the checks. This allows the user to take steps to improve the vehicle's condition. For instance, a recommendation to clean sensors may be given. This enables anticipatory service and maintenance. Additionally, a failed check can be repeated after the recommended action to attempt a successful outcome.

In some examples, at least one of the predefined checks in the set is conducted with the aid of at least one other vehicle and/or an infrastructure device in the surroundings. This can facilitate the checks by utilizing the sensor systems of nearby vehicles or infrastructure devices. For instance, a surroundings camera of an adjacent parked vehicle or a monitoring camera can check the appearance of the vehicle and detect any damage. Communication between the vehicle and the other vehicle or infrastructure device can occur directly or via a back-end server.

In some examples, at least selected checks of the set are suspended when starting a drive if at least one blocking condition is met. This prevents checks from being conducted under undesirable or impossible circumstances. Blocking conditions might include, but are not limited to:

The vehicle is being charged.

People are present in the surroundings, making the checks infeasible.

User enabling is required but has not been provided.

The vehicle is in a public space.

A user is not in the vehicle and thus cannot intervene.

The checks have been deactivated.

No predefined check time period exists.

It may be provided that a check for which a blocking condition exists is conducted by a user of the vehicle. The driver may confirm that the check was performed.

FIG. 1 shows a schematic representation to illustrate embodiments of the automated driving vehicle 50 and of the method. The vehicle 50 comprises a control device 1.

The control device 1 comprises a processing device 2, comprising, for example, one or more microprocessors and a memory 3. The processing device 2 carries out processing operations necessary for carrying out the method described in the present disclosure. The method described in the present disclosure will be described hereafter in greater detail based on the vehicle 50.

The control device 1 is configured to prompt a set 10 of predefined checks 11-$x$ to be conducted automatically each time a drive is started. This is done using predefined combinations 12-$x$ of the vehicle's sensor system 51 and actuator system 52. Information describing the set 10 is stored in the memory 3 and retrieved by the processing device 2 to perform the predefined checks 11-$x$.

Furthermore, the control device 1 checks whether cyclic checks 13-$x$ conducted in the past under predefined conditions were successful and met the required frequency 14-$x$. Information about the checks 13-$x$ and frequencies 14-$x$ is stored in the memory 3 and retrieved by the processing device 2 for verification.

The control device 1 enables a drive if the checks 11-$x$ performed at the start and the cyclic checks 13-$x$ conducted under predefined conditions were successful and met the required frequency 14-$x$. To enable the drive, the control device 1 generates an enabling signal 20, which is supplied to a vehicle control system 53.

To start the checks, the control device 1 receives a start signal 21 from the vehicle control system 53. This occurs when the vehicle control system 53 determines that an automated drive is to commence, for example, when the vehicle 50 is turned on or a driving destination is entered. The checks can also be initiated anticipatorily if the start time of the automated drive is determined or predefined.

In some examples, different confidence levels 15-$x$ are assigned to the predefined checks 11-$x$ in the set 10. The checks 11-$x$ are conducted in the order of their confidence levels, with higher-ranking checks performed only after the successful completion of all previous levels.

For instance, checks 11-$x$ corresponding to confidence level 15-1 are conducted first, followed by checks 11-$x$ of confidence level 15-2, and then checks 11-$x$ of confidence level 15-3. Successfully completing all checks 11-$x$ of confidence level 15-1 is a prerequisite for performing checks 11-$x$ of confidence level 15-2, and so on. The scope of functions available to the vehicle 50 during these checks, particularly regarding automated driving functions and route selection, increases with the rank of the confidence levels 15-$x$. The number and assignment of checks 11-$x$ and confidence levels 15-$x$ can vary.

In some examples, the checks 11-$x$ in the set 10 include checks at a standstill, checks when driving slowly, and checks while driving, with confidence levels 15-x ascending in this order. This sequence corresponds to an incrementally increasing scope of functions available to the vehicle 50 during the checks 11-x.

In some examples, a suitable route 25 for conducting the checks 11-x when driving slowly or driving is determined and followed. The control device 1 determines the route 25 to ensure favorable conditions for conducting the checks 11-x. These conditions might include predefined optically detectable features in the surroundings or certain scenarios to test the vehicle's driving dynamics. The determined route 25 is then supplied to the vehicle control system 53 for execution.

The route 25 may also be determined considering a previously achieved confidence level 15-x. For instance, at lower confidence levels 15-x, the vehicle might only operate on private property. At higher confidence levels 15-x, the vehicle may be allowed to drive in public spaces.

In some examples, the checks 11-x in the set 10 and the cyclic checks 13-x each have a temporal validity. The execution of a check 11-x, 13-x is suspended, and the check is considered passed if its temporal validity has not yet elapsed. The control device 1 verifies the temporal validity of each check 11-x, 13-x before conducting it. If the temporal validity has not elapsed, the check 11-x, 13-x is suspended. If the temporal validity has elapsed, the check 11-x, 13-x is conducted. Temporal validity is determined using a predefined validity duration, setting a future point in time from the last successful execution of the check 11-x.

The control device 1 then checks for each check 11-x, 13-x to be conducted whether or not the temporal validity has elapsed. If the temporal validity has not yet elapsed, the associated check 11-x, 13-x is suspended. If the temporal validity has elapsed, the associated check 11-x, 13-x is conducted. The temporal validity can be determined, for example, by using a predefined value for a validity duration and setting a future point in time based on when the particular check 11-x was last conducted successfully.

It may be provided that a position and/or an orientation suitable for the set 10 of predefined checks 11-x is selected when the automated driving vehicle 50 is being parked. For this purpose, a route is determined for an automated drive in such a way that the suitable position and/or orientation are at the final destination of the drive. For example, the vehicle may head for a private property or surroundings where certain objects and/or features are present, allowing a surroundings sensor system to be checked particularly well. In particular, the control device 1 determines the suitable position and/or orientation. Alternatively, a navigation system (not shown) can also determine and/or select the suitable position and/or orientation. Suitable positions and/or orientations may be stored in a surroundings map and can be selected and headed for if they are situated in the vicinity.

It may be provided that a user of the vehicle 50 is prompted to conduct one or more missing checks 11-x when it is not possible to conduct at least one of the predefined checks 11-x of the set 10 in an automated manner. The control device 1 can transmit prompting information 22 to a display device 54 of the vehicle 50 or a mobile device 30 of the user, which includes a prompt to conduct the check 11-x and/or instructions for conducting the check 11-x.

It may be provided that a user is given an action recommendation 23 based on the results of the checks 11-x, 13-x. Such an action recommendation 23 can include a request to conduct service, clean, or replace surroundings sensors, and the like.

It may be provided that at least one of the predefined checks 11-x of the set 10 is conducted with the aid of at least one other vehicle 60 and/or at least one infrastructure device 61 in the surroundings of the vehicle 50. The control device 1 can communicate via car-to-X communication with the at least one other vehicle 60 and/or the at least one infrastructure device 61. It is then possible, for example, to determine whether a surroundings sensor system of the at least one other vehicle 60 and/or the at least one infrastructure device 61 can detect the vehicle 50. If this is the case, images of the vehicle 50 can be detected by means of the surroundings sensor system of the other vehicle 60 and/or the infrastructure device 61 and transmitted to the vehicle 50. The control device 1 can then evaluate the detected and transmitted images and determine and check a (visual) condition of the vehicle 50 using known methods of artificial intelligence and/or pattern recognition. Communication takes place via a communication device 55 of the vehicle 50.

It may be provided that at least selected checks 11-x of the set 10 are suspended when starting a drive if at least one blocking condition 24 is met. The presence of at least one blocking condition 24 is checked by the control device 1. The blocking condition 24 can also apply to all checks when starting a drive. Examples of blocking conditions 24 may include:

The vehicle 50 is in the process of being charged.

Persons are present in the surroundings, making the checks 11-x not possible.

Enabling must take place by a user and this enabling has not been provided.

The vehicle 50 is located in public space.

A user is not in the vehicle 50 (thus cannot intervene in the checks 11-x).

Conducting the checks 11-x has been deactivated.

No predefined check time period exists.

And so forth.

Figure 2:
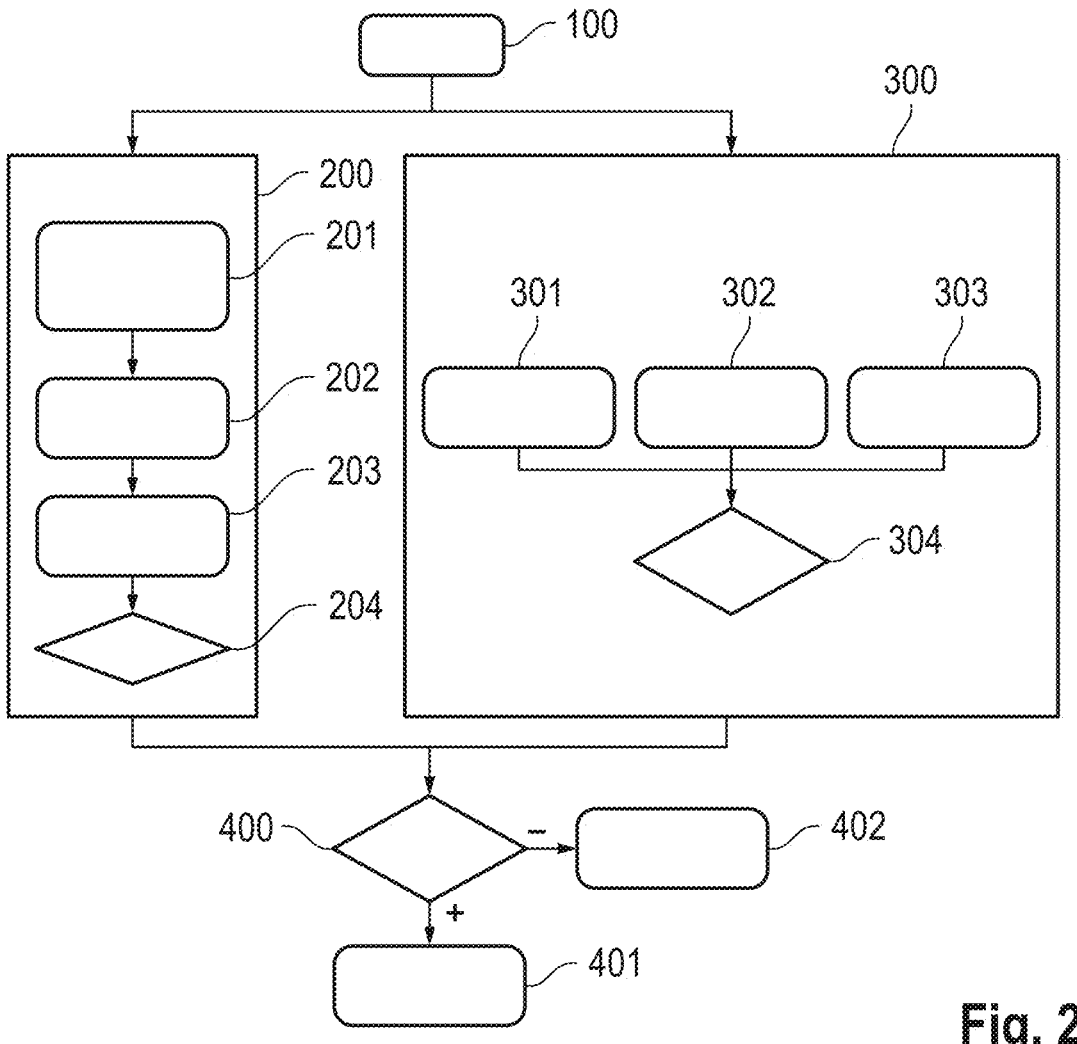
FIG. 2 shows a schematic flow chart to illustrate an embodiment of the method for checking an automated driving vehicle prior to starting a drive, according to some aspects of the present disclosure.

FIG. 2 shows a schematic flow chart illustrating an embodiment of the method for checking an automated driving vehicle prior to starting a drive. The method is conducted by a vehicle, as described with reference to FIG. 1.

After the method has started 100, initiated by a start signal from a vehicle control system, the checks when starting a drive are conducted in method step 200. This occurs in a rank order of various confidence levels, corresponding to a respective (limited) scope of functions of the automated driving function. Method step 200 comprises method steps 201 to 204.

In method step 201, checks are conducted at a standstill. These checks can include traditional start-up checks, such as verifying that sensor values are within a permissible range. Furthermore, these checks can involve predefined combinations of a sensor system and an actuator system of the vehicle, where a respective actuator system is activated and the corresponding sensor data is checked to ensure expected values and/or behavior (e.g., detection of steering movements by means of a surroundings camera, starting off against a blocking brake, etc.).

In method step 202, checks when driving slowly are conducted. Here, a surroundings sensor system and surroundings perception and interpretation are checked.

In method step 203, checks when driving are conducted, with a confidence range incrementally increased as checks are conducted successfully, and the scope of functions of the automated driving process increased accordingly.

In method step 204, it is checked whether all predefined checks in the set were conducted successfully when starting a drive.

Furthermore, after the method has started 100, it is checked in method step 300 whether cyclic checks conducted in the past under predefined conditions were successful with sufficient frequency. The frequency is detected using counters (particularly IUMPR counters). Method step 300 comprises method steps 301 to 304.

In method step 301, it is checked whether checks conducted under conditions that are regularly established during the drive (e.g., speed range, wheel angle, weather conditions) were conducted successfully with a predefined frequency. The counter reading of a counter that detects the frequency with which the check was conducted successfully is queried and compared to a predefined minimum value.

In method step 302, it is checked whether checks conducted under conditions that are regularly established after the drive (e.g., cooling curves, certain temperature ranges) were conducted successfully with a predefined frequency. The counter reading of a counter that detects the frequency with which the check was conducted successfully is queried and compared to a predefined minimum value.

In method step 303, it is checked whether checks conducted under conditions that must be specifically established by the vehicle (e.g., specific ambient conditions, specific boundary conditions) were conducted successfully with a predefined frequency. The counter reading of a counter that detects the frequency with which the check was conducted successfully is queried and compared to a predefined minimum value.

In method step 304, it is checked whether all cyclic checks were successfully conducted with the respective predefined frequency.

In method step 400, it is verified whether the checks conducted when starting a drive were successful, and whether the cyclic checks were conducted successfully with the respective predefined frequency. If both conditions are met, a drive by way of the automated driving vehicle is enabled in method step 401. Otherwise, a corresponding message may be output to a user in method step 402.

Further embodiments of the method were already described with reference to FIG. 1.

LIST OF REFERENCE NUMERALS

1 control device
2 processing device
3 memory
10 set
11-*x* check (when starting a drive)
12-*x* combination
13-*x* check (cyclic)
14-*x* frequency
15-*x* confidence level
20 enabling signal
21 start signal
22 piece of prompting information
23 action recommendation
24 blocking condition
25 route
30 mobile device
50 vehicle
51 sensor system
52 actuator system
53 vehicle control system
54 display device

55 communication device
60 other vehicle
61 infrastructure device
100 method step
200-204 method steps
300-304 method steps
400-401 method steps

The invention claimed is:

1. A method for checking an automated driving vehicle prior to starting a drive, comprising:

conducting a set of predefined checks in an automated manner when the vehicle is started, wherein the predefined checks are performed at least partly using predefined combinations of a sensor system and an actuator system of the vehicle;

verifying whether cyclic checks previously conducted under predefined conditions were conducted successfully with a required frequency; and enabling a drive of the automated driving vehicle when the predefined checks conducted at the start of the drive and the cyclic checks have been successfully completed with the required frequency.

2. The method according to claim 1, wherein different confidence levels are assigned to the predefined checks in the set, the predefined checks being conducted when starting a drive in the rank order of the confidence levels, and the predefined checks having a higher-ranking confidence level only being conducted when the predefined checks of all previous confidence levels have been conducted successfully.

3. The method according to claim 2, wherein the predefined checks in the set comprise predefined checks at a standstill, predefined checks when driving at a speed below a predefined threshold, and predefined checks when driving, the confidence levels ascending in the order of standstill, driving slowly, and driving.

4. The method according to claim 3, wherein a route that is suitable for the predefined checks is determined and/or followed for conducting the predefined checks when driving at the speed below the predefined threshold and/or when driving.

5. The method according to claim 4, wherein the route is determined taking into consideration a previously achieved confidence level.

6. The method according to claim 1, wherein the predefined checks and the cyclic checks each have a temporal validity, and wherein a respective check is considered to have been passed if the temporal validity of the respective check has not yet elapsed.

7. The method according to claim 1, wherein a position and/or an orientation suitable for the set of predefined checks is selected when the automated driving vehicle is being parked.

8. The method according to claim 1, further comprising prompting a user to conduct one or more missing predefined checks when it is not possible to conduct at least one of the predefined checks of the set in an automated manner.

9. The method according to claim 1, further comprising providing an action recommendation based on results of the predefined checks and/or the cyclic checks.

10. The method according to claim 1, wherein at least one of the predefined checks of the set is conducted with the aid of at least one other vehicle and/or at least one infrastructure device in a surroundings of the vehicle.

11. The method according to claim 1, wherein at least selected predefined checks of the set are suspended when starting a drive if at least one blocking condition is met.

12. An automated driving vehicle, comprising:

a control device configured to prompt a set of predefined checks to be conducted in an automated manner when a drive is started, wherein the predefined checks are performed at least partly using predefined combinations of a sensor system and an actuator system of the vehicle;

the control device further configured to verify whether cyclic checks previously conducted under predefined conditions were conducted successfully with a required frequency; and the control device configured to enable a drive of the automated driving vehicle when the predefined checks conducted at the start of the drive and the cyclic checks have been successfully completed with the required frequency.

13. The automated driving vehicle according to claim 12, wherein the control device is configured such that different confidence levels are assigned to the predefined checks in the set, the predefined checks being conducted when starting a drive in the rank order of the confidence levels, and the predefined checks having a higher-ranking confidence level are only conducted when the predefined checks of all previous confidence levels have been conducted successfully.

14. The automated driving vehicle according to claim 13, wherein the control device is configured such that the predefined checks in the set comprise predefined checks at a standstill, predefined checks when driving at a speed below a predefined threshold, and predefined checks when driving, the confidence levels ascending in the order of standstill, driving slowly, and driving.

15. The automated driving vehicle according to claim 14, wherein the control device is configured to determine and/or follow a route that is suitable for the predefined checks when driving at the speed below the predefined threshold and/or when driving.

16. The automated driving vehicle according to claim 15, wherein the control device is configured to determine the route taking into consideration a previously achieved confidence level.

17. The automated driving vehicle according to claim 12, wherein the control device is configured such that the predefined checks and the cyclic checks each have a temporal validity, and wherein a respective check is considered to have been passed if the temporal validity of the respective check has not yet elapsed.

18. The automated driving vehicle according to claim 12, wherein the control device is configured to select a position and/or an orientation suitable for the set of predefined checks when the automated driving vehicle is being parked.

19. The automated driving vehicle according to claim 12, wherein the control device is configured such that at least one of the predefined checks of the set is conducted with the aid of at least one other vehicle and/or at least one infrastructure device in surroundings of the vehicle.

20. A control device for an automated driving vehicle, the control device comprising:

a processing device and a memory;

wherein the processing device is configured to:

prompt a set of predefined checks to be conducted in an automated manner when the vehicle is started, wherein the predefined checks are at least partly performed using predefined combinations of a sensor system and an actuator system of the vehicle;

verify whether cyclic checks previously conducted under predefined conditions were conducted successfully with a required frequency; and enable a drive of the automated driving vehicle when the predefined checks conducted at the start of the drive and the cyclic checks have been successfully completed with the required frequency.

* * * * *